(12) United States Patent
Heisler

(10) Patent No.: US 8,465,690 B1
(45) Date of Patent: Jun. 18, 2013

(54) FLUID INVERSION LINER APPARATUS

(76) Inventor: John Heisler, Estelline, SD (US)

( * ) Notice: Subject to any disclaimer, the term of this patent is extended or adjusted under 35 U.S.C. 154(b) by 292 days.

(21) Appl. No.: 12/828,705

(22) Filed: Jul. 1, 2010

(51) Int. Cl.
*B29C 73/00* (2006.01)
*B32B 43/00* (2006.01)

(52) U.S. Cl.
USPC .......... 264/516; 156/187; 264/36.17; 425/14; 425/387.1

(58) Field of Classification Search
USPC ............. 425/14, 59, 387.1; 264/36.16, 36.17, 264/516; 156/94, 287; 138/97, 98
See application file for complete search history.

(56) References Cited

U.S. PATENT DOCUMENTS

| | | | |
|---|---|---|---|
| 1,009,063 A | 11/1911 | Gilchrist | |
| 3,720,557 A * | 3/1973 | Longoni | 156/156 |
| 3,959,424 A * | 5/1976 | Dawson et al. | 264/516 |
| 4,064,211 A | 12/1977 | Wood | |
| 4,135,958 A | 1/1979 | Wood | |
| 4,496,499 A * | 1/1985 | Brittain et al. | 264/36.17 |
| 4,640,313 A * | 2/1987 | Stanley | 138/141 |
| 4,668,125 A | 5/1987 | Long, Jr. | |
| 4,773,450 A * | 9/1988 | Stanley | 138/98 |
| 5,104,595 A * | 4/1992 | Hunter | 264/33 |
| 5,154,936 A * | 10/1992 | Driver et al. | 425/182 |
| 5,167,901 A * | 12/1992 | Driver et al. | 264/570 |
| 5,358,359 A * | 10/1994 | Long, Jr. | 405/184.2 |
| 5,549,856 A * | 8/1996 | Yokoshima | 264/36.17 |
| 5,566,719 A * | 10/1996 | Kamiyama et al. | 138/98 |
| 5,597,353 A * | 1/1997 | Alexander, Jr. | 425/387.1 |
| 5,601,763 A * | 2/1997 | Hunter et al. | 264/36.17 |
| 5,606,997 A * | 3/1997 | Blackmore et al. | 138/98 |
| RE35,944 E * | 11/1998 | Driver et al. | 264/570 |
| 5,942,183 A * | 8/1999 | Alexander, Jr. | 264/516 |
| 5,971,031 A * | 10/1999 | Kamiyama et al. | 138/98 |
| 6,006,787 A * | 12/1999 | Kamiyama et al. | 138/98 |
| 6,105,619 A | 8/2000 | Kiest, Jr. | |
| 6,390,795 B1 * | 5/2002 | Waring et al. | 425/11 |
| 6,484,757 B1 * | 11/2002 | Warren | 138/98 |
| 6,641,687 B2 | 11/2003 | Kiest, Jr. et al. | |
| 6,960,313 B2 * | 11/2005 | Waring et al. | 264/36.17 |
| 6,994,118 B2 | 2/2006 | Kiest, Jr. et al. | |
| 7,051,766 B2 * | 5/2006 | Kamiyama et al. | 138/98 |
| 7,476,348 B2 * | 1/2009 | Waring | 264/36.17 |
| 7,789,643 B2 * | 9/2010 | Lepola et al. | 425/35 |
| 7,845,372 B2 * | 12/2010 | Kiest, Jr. | 138/98 |
| 7,988,437 B1 * | 8/2011 | Bonanotte et al. | 425/11 |
| 8,066,499 B2 * | 11/2011 | Driver et al. | 425/11 |
| 8,176,977 B2 * | 5/2012 | Keller | 166/242.2 |
| 2003/0209823 A1 * | 11/2003 | Waring et al. | 264/36.17 |
| 2004/0045617 A1 * | 3/2004 | Kamiyama et al. | 138/98 |
| 2005/0045324 A1 * | 3/2005 | Cook et al. | 166/98 |
| 2005/0098909 A1 * | 5/2005 | Kiest | 264/36.17 |

(Continued)

*Primary Examiner* — Yogendra Gupta
*Assistant Examiner* — Emmanuel S Luk

(57) ABSTRACT

A fluid inversion liner apparatus controls fluid loss to permit lining of pipe in smaller spaces by requiring less fluid. The apparatus includes a housing, a liner feeding assembly, and a nozzle. A tubular flexible liner is insertable through the liner feeding assembly. The liner has a first end couplable to the nozzle forming a fluid seal at the nozzle. A fluid injection port is provided for introducing fluid such as air or water into the housing. The liner feeding assembly is adjustable for conforming to the liner as the liner passes through the liner feeding assembly. Thus, fluid introduced into the housing through the fluid injection port is prevented from passing out of the housing through the liner feeding assembly. As a result, fluid pressure between the interior of the housing and the liner draws the liner through the liner feeding assembly and out of the nozzle.

18 Claims, 6 Drawing Sheets

U.S. PATENT DOCUMENTS

2006/0093436 A1*  5/2006  Gearhart ................... 405/184.2
2006/0159791 A1*  7/2006  Kamiyama et al. ............ 425/11
2007/0029688 A1   2/2007  Delaney et al.
2007/0240779 A1* 10/2007  Kamiyama et al. ............ 138/98
2008/0277838 A1* 11/2008  Hassen et al. ................ 264/511
2009/0211765 A1*  8/2009  Keller ......................... 166/377

* cited by examiner

FLUID INVERSION LINER APPARATUS

BACKGROUND OF THE DISCLOSURE

Field of the Disclosure

The disclosure relates to cured in place liners and more particularly pertains to a new cured in place liner apparatus for controlling the amount of fluid loss through the entry port of the device to permit lining of pipe in smaller spaces using less fluid.

SUMMARY OF THE DISCLOSURE

An embodiment of the disclosure meets the needs presented above by generally comprising a housing, a liner feeding assembly, and a nozzle. A tubular flexible liner is insertable through the liner feeding assembly. The liner has a first end couplable to the nozzle forming a fluid seal at the nozzle. A fluid injection port is provided in the housing for introducing fluid such as air or water into an interior of the housing. The liner feeding assembly is adjustable for conforming to the liner as the liner passes through the liner feeding assembly. Thus, fluid introduced into the housing through the fluid injection port is prevented from passing out of the housing through the liner feeding assembly. As a result, fluid pressure between the interior of the housing and the liner draws the liner through the liner feeding assembly and out of the nozzle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
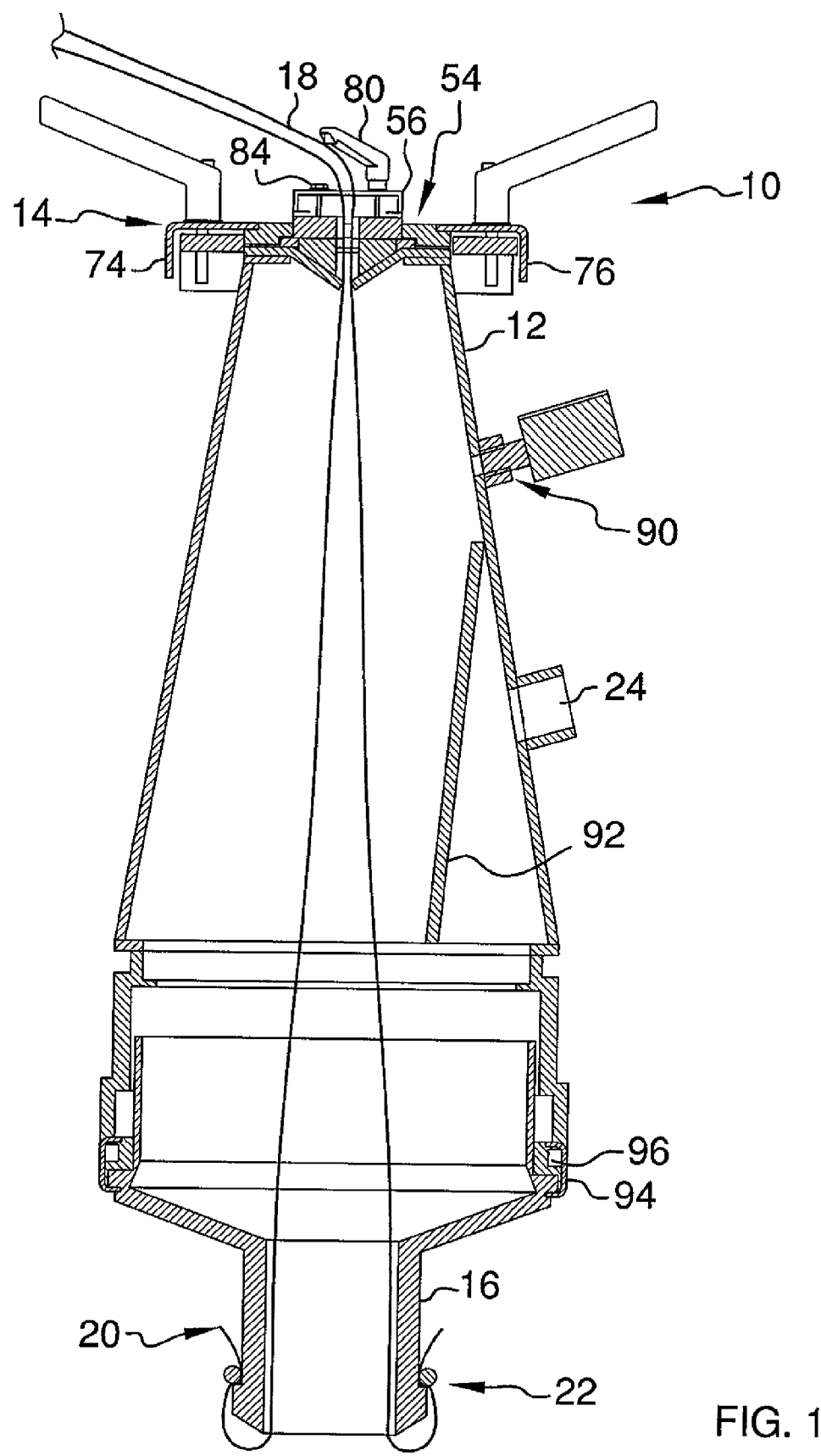
FIG. 1 is a cross-sectional view of a fluid inversion liner apparatus according to an embodiment of the disclosure.
Figure 2:
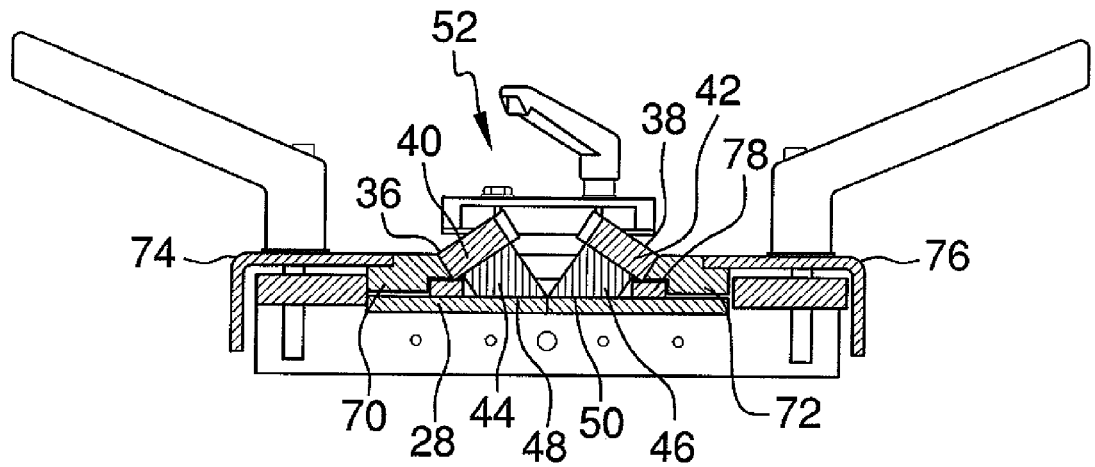
FIG. 2 is a cross-sectional view of a liner feeding assembly of an embodiment of the disclosure in a closed position.
Figure 3:
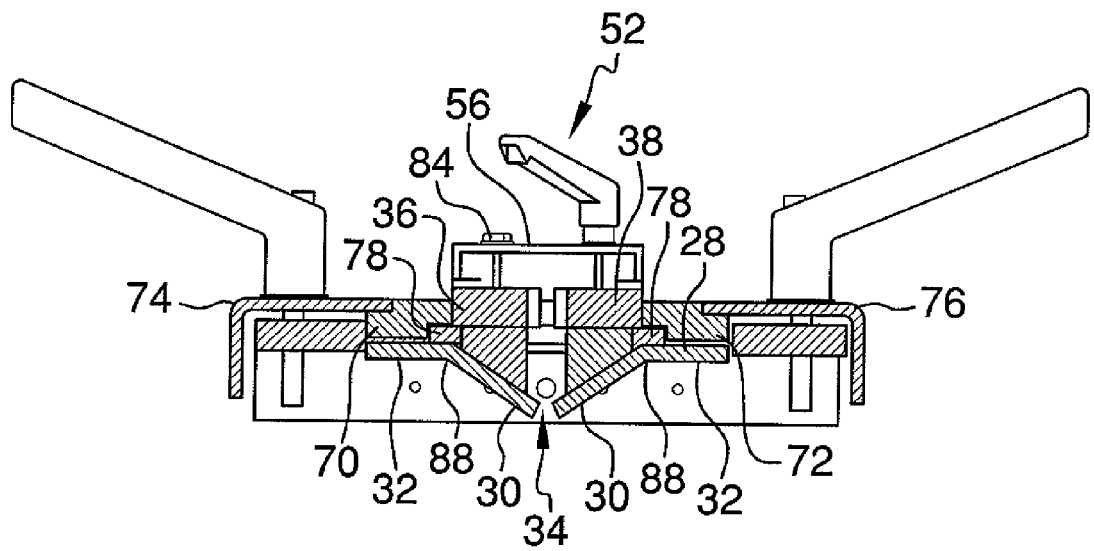
FIG. 3 is a cross-sectional view of a liner feeding assembly of an embodiment of the disclosure in an open position.
Figure 4:
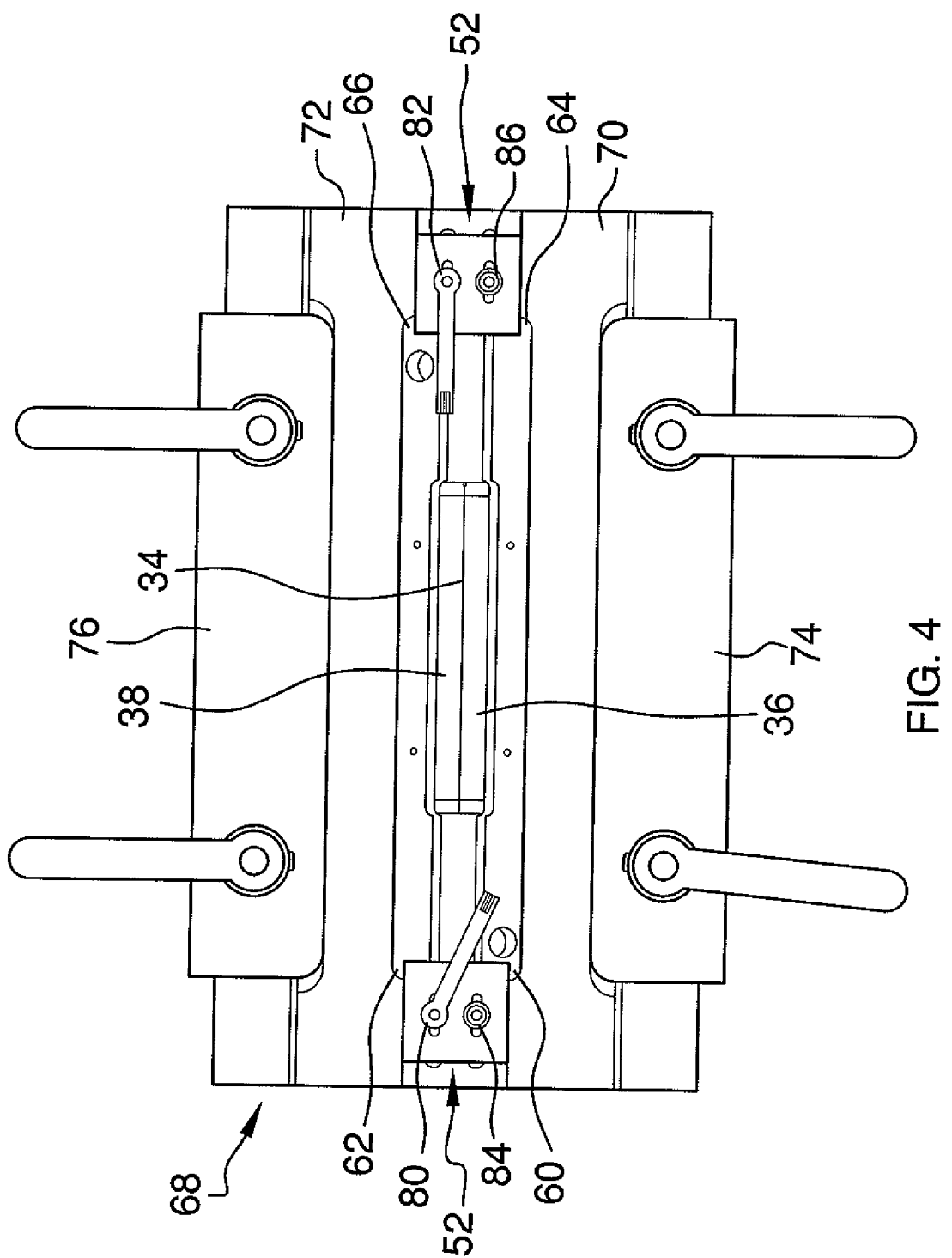
FIG. 4 is a top view of an embodiment of the disclosure.
Figure 5:
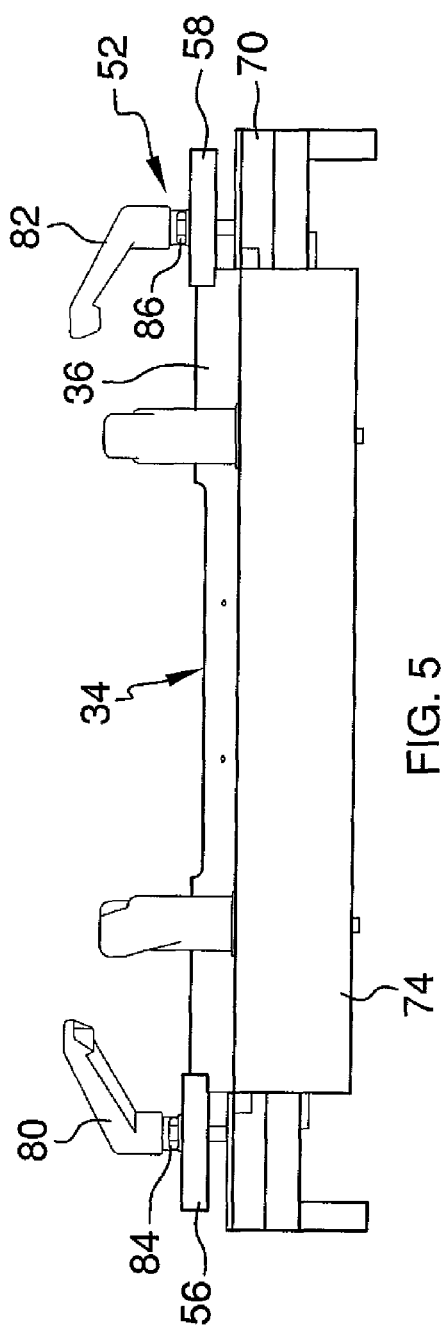
FIG. 5 is a side view of a liner feeding assembly of an embodiment of the disclosure.
Figure 6:
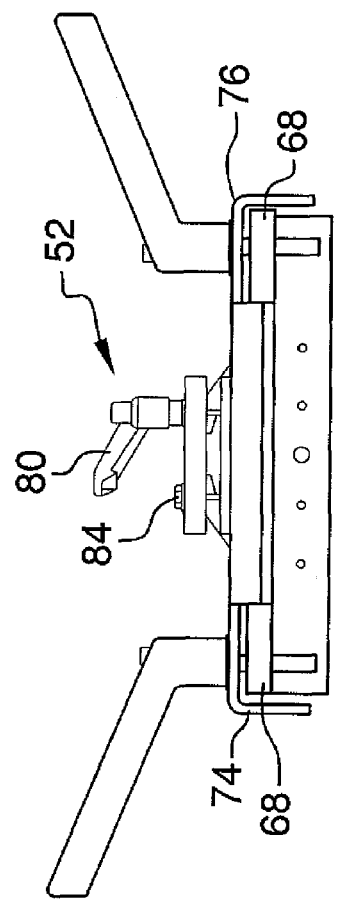
FIG. 6 is an end view of a liner feeding assembly of an embodiment of the disclosure.
Figure 7:
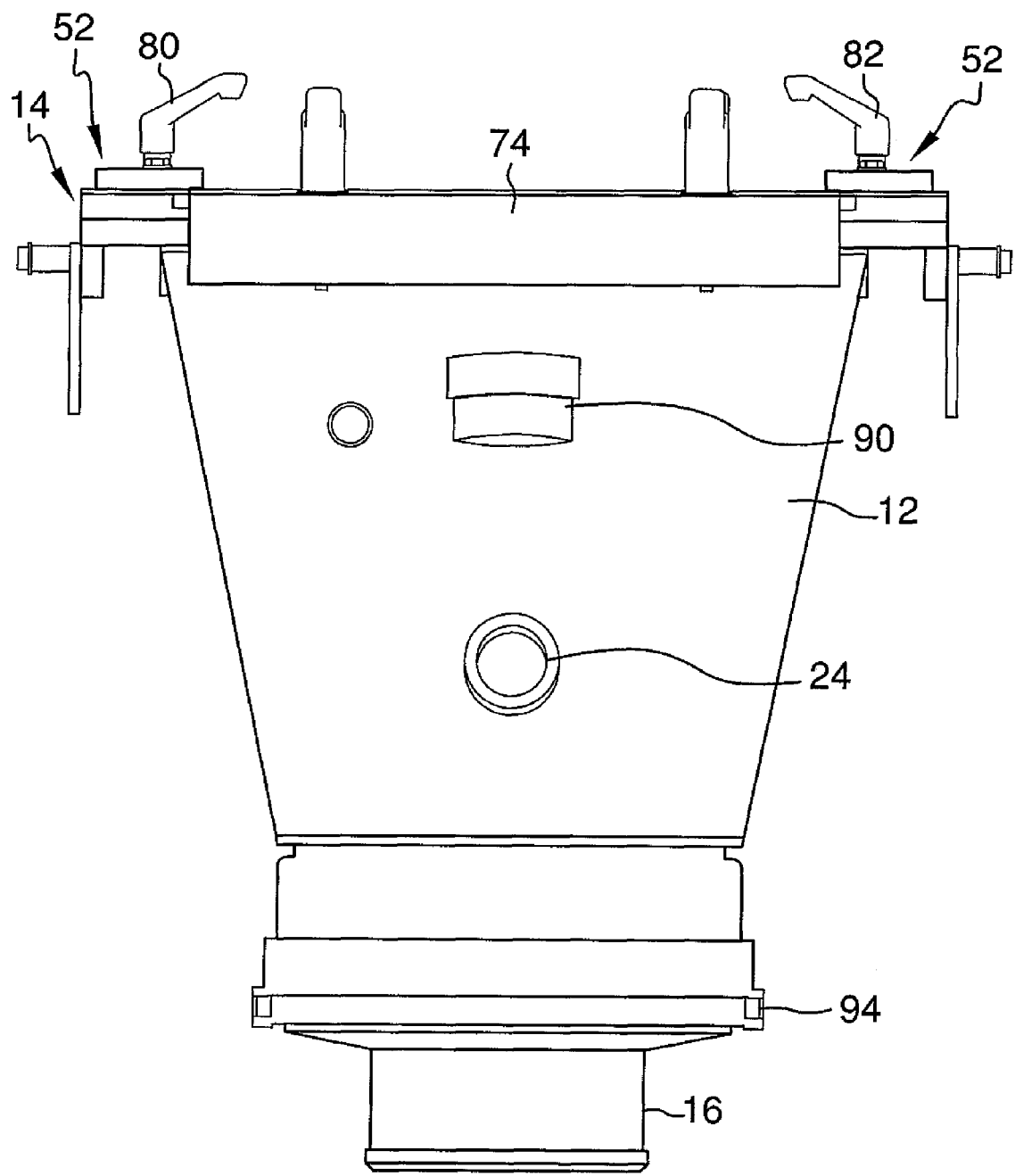
FIG. 7 is a side view of an embodiment of the disclosure.
Figure 8:
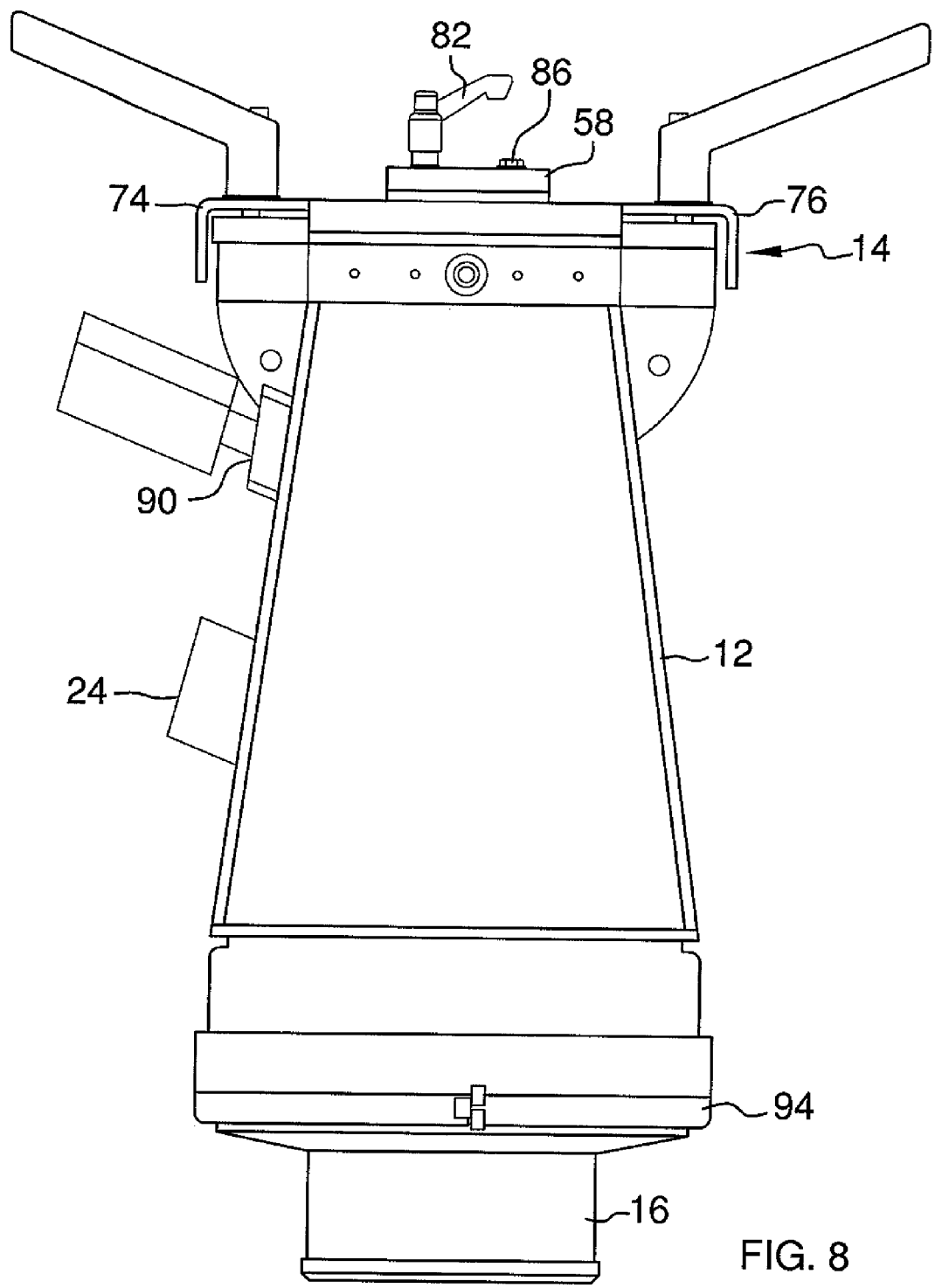
FIG. 8 is an end view of an embodiment of the disclosure.

With reference now to the drawings, and in particular to FIGS. 1 through 8 thereof, a new cured in place liner embodying the principles and concepts of an embodiment of the disclosure and generally designated by the reference numeral 10 will be described.

As best illustrated in FIGS. 1 through 8, the fluid inversion liner apparatus 10 generally comprises a housing 12, a liner feeding assembly 14 coupled to the housing 12, and a nozzle 16 coupled to the housing 12. A tubular flexible liner 18 is insertable through the liner feeding assembly 14. The liner 18 has a first end 20 couplable to the nozzle 16 forming a fluid seal 22 at the nozzle 16. A fluid injection port 24 is provided in the housing 12 for introducing fluid such as air or water into an interior 26 of the housing 12. The liner feeding assembly 14 is adjustable for conforming to the liner 18 as the liner 18 passes through the liner feeding assembly 14. Thus, fluid introduced into the housing 12 through the fluid injection port 24 is prevented from passing out of the housing 12 through the liner feeding assembly 14. As a result, fluid pressure between the interior 26 of the housing 12 and the liner 18 draws the liner 18 through the liner feeding assembly 14 and out of the nozzle 16.

The liner feeding assembly 14 includes a gasket 28 having an interior portion 30, an exterior portion 32, and a longitudinal slot 34. The exterior portion 32 of the gasket 28 is positioned in a static position against the housing 12. The liner feeding assembly 14 may also include a pair of wedge members 36,38. The wedge members are positioned adjacent to the interior portion 30 of the gasket 28. Each of the pair of wedge members 36,38 has a head portion 40,42 and an extension portion 44,46. Each extension portion 44,46 has a respective planar surface 48,50 abutting the exterior portion 32 of the gasket 28.

The liner feeding assembly 14 has a wedge adjustment assembly 52 for urging the pair of wedge members 36,38 against the interior portion 30 of the gasket 28. Thus, the interior portion 30 of the gasket 28 adjacent to the longitudinal slot 34 is pivoted relative to an exterior portion 32 of the gasket 28 to adjust a size of the longitudinal slot 34. The liner feeding assembly 14 has a wedge cradling portion 54 for supporting the pair of wedge members 36,38 in position relative to the gasket 28. The wedge adjustment assembly 52 may have a pair of wedge brackets 56,58 coupled to the wedge cradling portion 54 adjacent to respective first ends 60,62 and second ends 64,66 of the pair of wedge members 36,38 such that the gasket 28 urges the wedge members 36,38 into contact with the pair of wedge brackets 56,58.

The wedge brackets 56,58 may be adjustably coupled to the wedge cradling portion 54 or a frame assembly 68 described below such that a distance between the wedge cradling portion 54 or frame assembly 68 and the pair of wedge brackets 56,58 is adjustable. Adjustment of this distance adjusts the amount of pivoting of the interior portion 30 of the gasket 28 relative to the statically positioned exterior portion 34.

The liner feeding assembly 14 may also include the frame assembly 68 which couplable to the housing 12. The wedge cradling portion 54 may be removably coupled to the frame assembly 68. Similarly, the gasket 28 and wedge members 36,38 may be removable. Thus, these parts may all be provided in specific sizes and interchanged as desired to accommodate various sizes of liner 18 utilizing the same housing 12.

The wedge cradling portion 54 includes a pair of cradling members 70,72. The frame assembly 68 includes a pair of frame brackets 74,76 positioned adjacent to the wedge cradling members 70,72 such that the wedge cradling members 70,72 are held against the exterior portion 32 of the gasket 28. A gasket stiffener plate 78 may be positioned adjacent to the gasket 28 around the longitudinal slot 34 proximate a juncture 88 between the exterior portion 34 of the gasket 28 and the interior portion 30 of the gasket 28.

The wedge adjustment assembly 52 also may include a pair of gross adjustment handles 82,84. Each gross adjustment handle 80,82 may be operationally coupled to a respective one of the wedge brackets 56,58 such that turning of the gross adjustment handles 80,82 adjusts the distance between the wedge cradling portion 54 and the pair of wedge brackets 56,58. Fine adjustment screws 84,86 may be operationally coupled to an associated one of the wedge brackets 56,58 such that turning of the fine adjustment screws 84,86 adjusts the distance between the wedge cradling portion 54 and the pair of wedge brackets 56,58. Conventional structure may be employed such that rotation of the fine adjustment screws 84,86 produces a smaller adjustment to the distance between the wedge cradling portion 54 and the pair of wedge brackets 56,58 than an equal amount of rotation of the gross adjustment handles 80,82. Alternatively, similar structure may be coupled to the frame assembly 68 instead of the wedge cradling assembly 52 if a circumferential frame is employed.

A lubrication injection port 90 may be provided in the housing 12 to introduce a lubricant into the interior 26 to facilitate movement of the liner 18 through the housing 12 and nozzle 16. A fluid diversion member 92 may be positioned in the interior 26 of the housing 12 proximate the fluid injection port 24 for diverting fluid injected into the interior 26 of the housing 12 towards the nozzle 16. The nozzle 16 may be removably coupled to the housing 12 employing a quick connect band 94 and a nozzle gasket 96 to facilitate forming a seal between the nozzle 16 and the housing 12.

In use, an appropriately sized liner 18 is selected to be injected into a pipe, not shown, or other similar structure. The pipe will have been lined with an ambient curing resin which does not require additional heat to be supplied for curing purposes. A gasket 28 and wedge members 36,38 of corresponding size are selected and coupled to the frame assembly 68 using the wedge adjustment assembly 52. The liner 18 is passed through the slot and the first end 20 of the liner 18 is coupled to the nozzle 16 and sealed. The wedge adjustment assembly 52 is manipulated to secure the gasket 28 around the liner 18 to inhibit fluid injected into the housing 12 from passing outwardly through the longitudinal slot 34.

Fluid, which again may be water or air, is introduced into the interior 26 of the housing 12 through the fluid injection port 24. The pressure within the housing 12 is adjusted to achieve sufficient pressure to cause the liner 18 to be drawn through the longitudinal slot 34 and out the nozzle 16. Because the first end 20 cannot move, the liner 18 will be forced outwardly of the nozzle 16 by the fluid and will abut the inner surface of the pipe so that it can be adhered to the pipe with the resin. As this happens, the liner 18 will also be drawn through the slot 34.

Adjustments may be made using the fine adjustment screws 84,86 to achieve a balance between the pressure within the housing 12 and the frictional drag on the liner passing through the longitudinal slot 34 to prevent or reduce fluid loss outwardly through the longitudinal slot while maintaining sufficient pressure to keep the liner 18 passing out of the nozzle 16. An estimated total length of liner 18 is determined and when the liner 18 is distributed through the nozzle and extends along half of that total length, the liner 18 may be cut. The wedge members 36,38 are then adjusted such that the interior portion 30 of the gasket 28 returns to an un-pivoted position to seal the longitudinal slot 34. Fluid is again passed through the fluid injection port 24 until the liner 18 is fully distributed through the pipe or other structure being lined.

The above process is more efficient than is typically found in the prior art as it prevents loss of air and/or water during the process. The ability to adjust the slot 34 greatly increases the control over amount of fluid needed and also greatly increases the speed at which the liner 18 is unfolded into to the pipe. This allows for resins which can be cured without the addition of heat as ambient curing resins tend to cure too quickly for use with other liner delivery systems.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A fluid inversion liner apparatus comprising:
    a housing;
    a liner feeding assembly coupled to said housing;
    a nozzle coupled to said housing;
    a tubular flexible liner, said liner being insertable through said liner feeding assembly, said liner having a first end couplable to said nozzle forming a fluid seal at said nozzle;
    a fluid injection port in said housing for introducing fluid into an interior of said housing; and
    said liner feeding assembly being adjustable for conforming to said liner as said liner passes through said liner feeding assembly such that fluid introduced into said housing through said fluid injection port is prevented from passing out of said housing through said liner feeding assembly and whereby fluid pressure between said interior of said housing and said liner draws said liner through said liner feeding assembly and out of said nozzle;
    said liner feeding assembly having a gasket through which said liner is fed into said housing, said gasket having an interior portion, an exterior portion, and a longitudinal slot;
    wherein said exterior portion of said gasket is positioned in a static position against said housing, said interior portion abutting said longitudinal slot; and
    said interior portion being adjustable to be pivoted downwardly towards said interior of said housing to selectively alter a size of said longitudinal slot.

2. The fluid inversion liner apparatus of claim 1, further comprising:
    said liner feeding assembly having a pair of wedge members, said wedge members being positioned adjacent to said interior portion of said gasket; and
    said liner feeding assembly having a wedge adjustment assembly for urging said pair of wedge members against said interior portion of said gasket whereby said interior portion of said gasket adjacent to said longitudinal slot is pivoted relative to an exterior portion of said gasket to adjust a size of said longitudinal slot.

3. The fluid inversion liner apparatus of claim 2, further comprising:

said liner feeding assembly having a wedge cradling portion for supporting said pair of wedge members; and said wedge adjustment assembly having a pair of wedge brackets coupled to said wedge cradling portion adjacent to said pair of wedge members such that said gasket urges said wedge members into contact with said pair of wedge brackets.

4. The fluid inversion liner apparatus of claim 3, wherein said wedge brackets are adjustably coupled to said wedge cradling portion such that a distance between said wedge cradling portion and said pair of wedge brackets is adjustable.

5. The fluid inversion liner apparatus of claim 3, further comprising:

said liner feeding assembly having a frame assembly coupled to said housing; and said wedge cradling portion being removably coupled to said frame assembly.

6. The fluid inversion liner apparatus of claim 5, further comprising:

said wedge cradling assembly including a pair of cradling members; and said frame assembly including a pair of frame brackets positioned adjacent to said wedge cradling members such that said wedge cradling members are held against said exterior portion of said gasket.

7. The fluid inversion liner apparatus of claim 2, further including a gasket stiffener plate positioned adjacent to said gasket around said longitudinal slot proximate a juncture between said exterior portion of said gasket and said interior portion of said gasket.

8. The fluid inversion liner apparatus of claim 1, further including a lubrication injection port in said housing.

9. The fluid inversion liner apparatus of claim 1, further including a fluid diversion member positioned in said interior of said housing, said fluid diversion member being positioned proximate said fluid injection port for diverting fluid injected into said interior of said housing towards said nozzle.

10. The fluid inversion liner apparatus of claim 1, wherein said nozzle is removably coupled to said housing.

11. The fluid inversion liner apparatus of claim 2, further including each of said pair of wedge members having a head portion and an extension portion, each said extension portion having a planar surface abutting said exterior portion of said gasket.

12. The fluid inversion liner apparatus of claim 4, further comprising:

said wedge adjustment assembly including a pair of gross adjustment handles; and wherein each gross adjustment handle being operationally coupled to an associated one of said wedge brackets such that turning of said gross adjustment handles adjusts said distance between said wedge cradling portion and said pair of wedge brackets.

13. The fluid inversion liner apparatus of claim 12, further comprising:

said wedge adjustment assembly including a pair of fine adjustment screws;

wherein each fine adjustment screw being operationally coupled to an associated one of said wedge brackets such that turning of said fine adjustment screws adjusts said distance between said wedge cradling portion and said pair of wedge brackets; and wherein rotation of said fine adjustment screws produces a smaller adjustment to said distance between said wedge cradling portion and said pair of wedge brackets than an equal amount of rotation of said gross adjustment handles.

14. The fluid inversion liner apparatus of claim 1, wherein said gasket is removable from said housing and interchangeable with another gasket accommodating a size of said liner.

15. A fluid inversion liner apparatus comprising:

a housing;

a liner feeding assembly coupled to said housing;

a nozzle coupled to said housing;

a tubular flexible liner, said liner being insertable through said liner feeding assembly, said liner having a first end couplable to said nozzle forming a fluid seal at said nozzle;

a fluid injection port in said housing for introducing fluid into an interior of said housing;

said liner feeding assembly being adjustable for conforming to said liner as said liner passes through said liner feeding assembly such that fluid introduced into said housing through said fluid injection port is prevented from passing out of said housing through said liner feeding assembly whereby fluid pressure between said interior of said housing and said liner draws said liner through said liner feeding assembly and out of said nozzle;

said liner feeding assembly having a gasket, said gasket having an interior portion, an exterior portion, and a longitudinal slot;

wherein said exterior portion of said gasket is positioned in a static position against said housing;

said liner feeding assembly having a pair of wedge members, said wedge members being positioned adjacent to said interior portion of said gasket;

said liner feeding assembly having a wedge adjustment assembly for urging said pair of wedge members against said interior portion of said gasket whereby said interior portion of said gasket adjacent to said longitudinal slot is pivoted relative to an exterior portion of said gasket to adjust a size of said longitudinal slot;

said liner feeding assembly having a wedge cradling portion for supporting said pair of wedge members;

said wedge adjustment assembly having a pair of wedge brackets coupled to said wedge cradling portion adjacent to said pair of wedge members such that said gasket urges said wedge members into contact with said pair of wedge brackets;

wherein said wedge brackets are adjustably coupled to said wedge cradling portion such that a distance between said wedge cradling portion and said pair of wedge brackets is adjustable;

said liner feeding assembly having a frame assembly coupled to said housing;

said wedge cradling portion being removably coupled to said frame assembly;

said wedge cradling assembly including a pair of cradling members;

said frame assembly including a pair of frame brackets positioned adjacent to said wedge cradling members such that said wedge cradling members are held against said exterior portion of said gasket;

a gasket stiffener plate positioned adjacent to said gasket around said longitudinal slot proximate a juncture between said exterior portion of said gasket and said interior portion of said gasket;

a lubrication injection port in said housing;

a fluid diversion member positioned in said interior of said housing, said fluid diversion member being positioned proximate said fluid injection port for diverting fluid injected into said interior of said housing towards said nozzle;

wherein said nozzle is removably coupled to said housing;
each of said pair of wedge members having a head portion and an extension portion, each said extension portion having a planar surface abutting said exterior portion of said gasket;
said wedge adjustment assembly including a pair of gross adjustment handles;
wherein each gross adjustment handle being operationally coupled to an associated one of said wedge brackets such that turning of said gross adjustment handles adjusts said distance between said wedge cradling portion and said pair of wedge brackets;
said wedge adjustment assembly including a pair of fine adjustment screws;
wherein each fine adjustment screw being operationally coupled to an associated one of said wedge brackets such that turning of said fine adjustment screws adjusts said distance between said wedge cradling portion and said pair of wedge brackets; and
wherein rotation of said fine adjustment screws produces a smaller adjustment to said distance between said wedge cradling portion and said pair of wedge brackets than an equal amount of rotation of said gross adjustment handles.

16. A method of lining a structure by fluid inversion lining, the steps of the method comprising:
   extending a liner through a fluid injection lining apparatus comprising
      a housing;
      a liner feeding assembly coupled to said housing;
      a nozzle coupled to said housing;
      a tubular flexible liner, said liner being insertable through said liner feeding assembly, said liner having a first end couplable to said nozzle forming a fluid seal at said nozzle;
      a fluid injection port in said housing for introducing fluid into an interior of said housing;
      wherein said liner feeding assembly is adjustable for conforming to said liner as said liner passes through said liner feeding assembly such that fluid introduced into said housing through said fluid injection port is prevented from passing out of said housing through said liner feeding assembly whereby fluid pressure between said interior of said housing and said liner draws said liner through said liner feeding assembly and out of said nozzle;
      said liner feeding assembly having a gasket, said gasket having an interior portion, an exterior portion, and a longitudinal slot;
      wherein said exterior portion of said gasket is positioned in a static position against said housing;
      said liner feeding assembly having a pair of wedge members, said wedge members being positioned adjacent to said interior portion of said gasket;
      said liner feeding assembly having a wedge adjustment assembly for urging said pair of wedge members against said interior portion of said gasket whereby said interior portion of said gasket adjacent to said longitudinal slot is pivoted relative to an exterior portion of said gasket to adjust a size of said longitudinal slot;
      said liner feeding assembly having a wedge cradling portion for supporting said pair of wedge members;
      said wedge adjustment assembly having a pair of wedge brackets coupled to said wedge cradling portion adjacent to said pair of wedge members such that said gasket urges said wedge members into contact with said pair of wedge brackets;
      wherein said wedge brackets are adjustably coupled to said wedge cradling portion such that a distance between said wedge cradling portion and said pair of wedge brackets is adjustable;
      said liner feeding assembly having a frame assembly coupled to said housing;
      said wedge cradling portion being removably coupled to said frame assembly;
      said wedge cradling assembly including a pair of cradling members;
      said frame assembly including a pair of frame brackets positioned adjacent to said wedge cradling members such that said wedge cradling members are held against said exterior portion of said gasket;
      a gasket stiffener plate positioned adjacent to said gasket around said longitudinal slot proximate a juncture between said exterior portion of said gasket and said interior portion of said gasket;
      a lubrication injection port in said housing;
      a fluid diversion member positioned in said interior of said housing, said fluid diversion member being positioned proximate said fluid injection port for diverting fluid injected into said interior of said housing towards said nozzle;
      wherein said nozzle is removably coupled to said housing;
      each of said pair of wedge members having a head portion and an extension portion, each said extension portion having a planar surface abutting said exterior portion of said gasket;
      said wedge adjustment assembly including a pair of gross adjustment handles;
      wherein each gross adjustment handle being operationally coupled to an associated one of said wedge brackets such that turning of said gross adjustment handles adjusts said distance between said wedge cradling portion and said pair of wedge brackets;
      said wedge adjustment assembly including a pair of fine adjustment screws;
      wherein each fine adjustment screw being operationally coupled to an associated one of said wedge brackets such that turning of said fine adjustment screws adjusts said distance between said wedge cradling portion and said pair of wedge brackets; and
      wherein rotation of said fine adjustment screws produces a smaller adjustment to said distance between said wedge cradling portion and said pair of wedge brackets than an equal amount of rotation of said gross adjustment handles;
   selecting said gasket and said wedge members to correspond to a size of said liner;
   coupling said gasket and said wedge members to said frame assembly using said wedge adjustment assembly;
   coupling said first end of said liner to said nozzle;
   positioning said liner to pass through said longitudinal slot of said gasket;
   adjusting said wedge adjustment assembly to secure said gasket around said liner to inhibit fluid injected into said housing from passing through said longitudinal slot;
   introducing fluid into said interior of said housing through said fluid injection port;
   adjusting pressure within said housing to achieve sufficient pressure to cause said liner to be drawn through said longitudinal slot and out said nozzle.

17. The method of claim 16, the steps of the method further comprising:
- determining a total length of said liner needed;
- distributing said liner through said nozzle until said liner extends along half of said total length;
- cutting said liner;
- adjusting said wedge members such that said interior portion of said gasket returns to an unpivoted position to seal said longitudinal slot; and
- injecting fluid through said fluid injection port until said liner is fully distributed through said structure being lined.

18. The method of claim 16, the steps of the method further comprising adjusting said fine adjustment screws to achieve a balance between pressure within said housing and frictional drag on said liner passing through said longitudinal slot to prevent or reduce fluid loss through said longitudinal slot while maintaining sufficient pressure to keep said liner passing out of said nozzle.

\* \* \* \* \*